INVENTOR
ISRAEL A. DAVID

BY *Carl A. Hechmer*

ATTORNEY 3,389,549
AROMATIC DICARBONYL SULFONATE
MODIFIED POLYCARBONAMIDES
Israel A. David, Wilmington, Del., assignor to E. I. du
Pont de Nemours and Company, Wilmington, Del., a
corporation of Delaware
Filed Jan. 17, 1966, Ser. No. 520,956
6 Claims. (Cl. 57—140)

ABSTRACT OF THE DISCLOSURE

A linear polycarbonamide fiber exhibiting improved dyeability has as an integral part of the polymer chain from 60 to 80 gram equivalents per $10^6$ grams of polymer of the recurring units

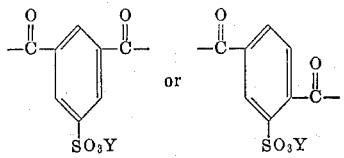

Figure 1:
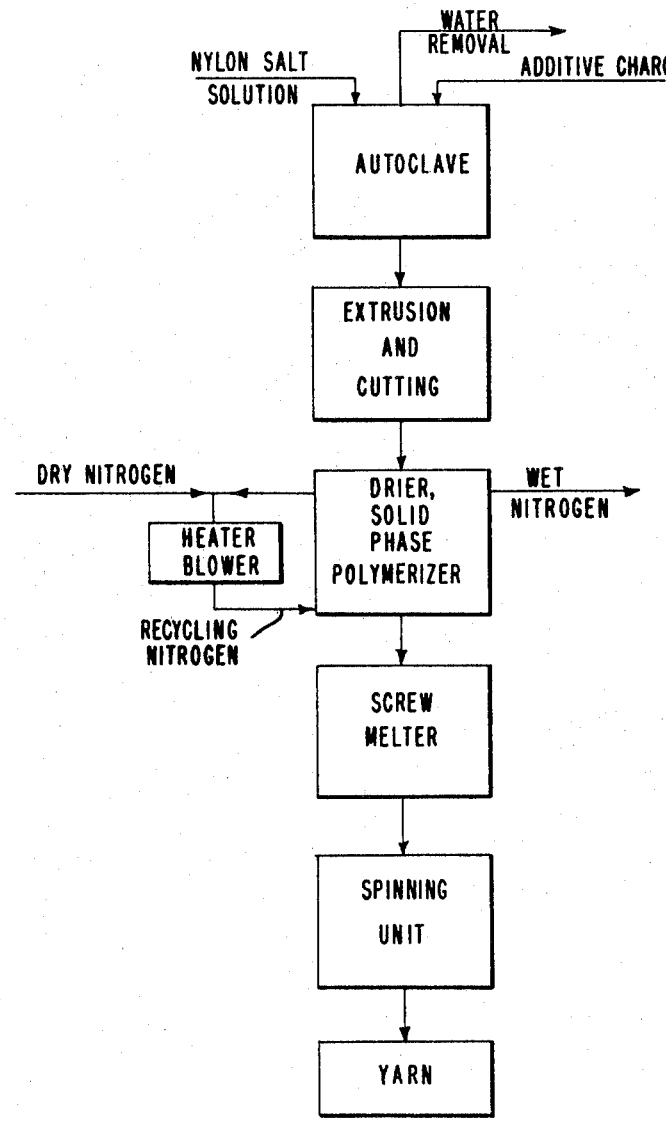
Figure 2:
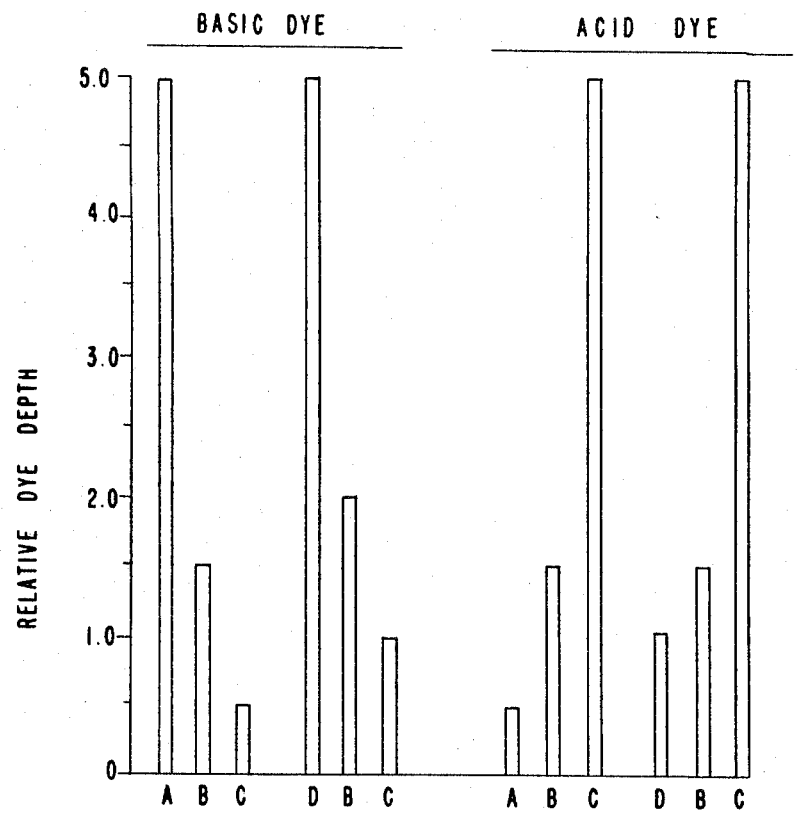

where Y can be ammonium, sodium, lithium or potassium. The polymer also has from 10 to 30 gram equivalents of amine ends per $10^6$ grams of polymer. The molecular weight can vary from 13,000 to 23,000.

---

This invention relates to modified polyamides and more particularly to modified polyamides with improved dyeing properties.

Multicolored nylon fabrics of dyed yarns are commonly produced by dyeing conventional polyamide yarns with different colored dyes and then converting the dyed yarns into fabric. As will be appreciated, there is considerable economic advantage in combining sulfonate-modified polyamides with unmodified polyamide and dyeing the fabric in a single bath of mixed dyes to achieve a comparable result. However, when sulfonate-modified polyamide is prepared as taught in U.S. Patent No. 3,184,436, it is found that the yarn does not take up nearly as much basic dye as is to be expected and also that the yarn is unacceptably stained by acid dyes. It is also observed that increasing the degree of the sulfonate modification, while improving basic-dye uptake, does not achieve desirable resistance to acid-dye staining.

In accordance with the present invention a novel, linear, polycarbonamide wherein recurring carbonamide linkages are an integral part of the polymer chain is provided, the said polycarbonamide containing (1) as an integral part of the polymer chain sufficient units from the class consisting of

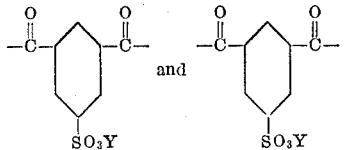

wherein Y is a member of the class consisting of ammonium, sodium lithium and potassium to provide from about 60 to about 80 sulfonate equivalents and (2) amine ends to provide from about 10 to about 30 amine equivalents, per $10^6$ grams of polymer, the said polycarbonamide having a molecular weight of between about 13,000 and about 23,000. Yarns from such polymer dye well in a mixed bath containing acid dye without excessive acid-dye staining. The polymers of this invention can be produced by polymerizing the polymer-forming composition in an autoclave using standard polymerization procedures, solidifying and fragmenting the polymer, increasing the degree of polymerization by further polymerizing the polymer in the solid phase while simultaneously super-drying the polymer, and further polymerizing the polymer in the molten state. In a preferred embodiment, the improved polymer is prepared by polymerizing 66 nylon salt containing sulfonate-modifier salt in an autoclave to a molecular weight of about 12,000, increasing the molecular weight to about 15,000 by solid-phase polymerization while super-drying the polymer, and melting the polymer in a screw extruder wherein the molecular weight is increased to about 17,000. Polymerization during melting occurs because the polyamide has been dried to less than the equilibrium moisture content.

The invention also encompasses multi-yarn fabrics suitable for cross-dyeing in which yarn formed from the above-described polymer is one component and an acid-dye sensitive yarn constitutes another component.

The invention will be more readily understood by reference to the drawings of which FIGURE I is a flow sheet and FIGURE II is a bar graph. Referring particularly to FIGURE I, a nylon salt solution of suitable concentration is fed into an autoclave in the conventional manner. After the temperature and pressure have been raised to polymerizing conditions, the modifying additives are added. During the polymerizing cycle water is removed from the system as a polymer melt is formed. Solidified flakes of polymer result from an extrusion and cutting of the product of the autoclave which is in turn fed to the combination dryer and solid phase polymerizer through which dry, heated nitrogen is continuously passed. The system provides for re-cycling of nitrogen and removal of wet nitrogen. This treatment acts to polymerize the flake in the solid form and to reduce it to an abnormally low moisture content. The product is fed directly to a screw melter which melts the polymer and feeds the melt to a spinneret. Hold-up time is controlled in the screw melter and its associated transfer line to permit additional polymerization in the melt as the polymer mass reaches equilibrium with its moisture content. The yarn product is spun from the spinning unit in the conventional manner. FIGURE II is referred to in greater detail in the examples.

The following examples are cited to illustrate the invention. They are not intended to limit it in any manner. In the examples the number of amine equivalents in $10^6$ grams of polymer is determined by dissolving 3 grams of polymer in 60 milliliters of a solvent consisting of, by weight, 15 parts of methanol and 85 parts of phenol and titrating with 0.05 M perchloric acid in methanol. A pH meter is used to follow the titration, and pH is plotted versus volume of perchloric acid added. The number of amine equivalents in $10^6$ grams of polymer is calculated from the formula:

Amine equivalents per $10^6$ grams of polymer=

$$\frac{V \times N}{W} \times 10^6$$

wherein:

V=Milliliters of perchloric acid required to reach the inflection point in the pH versus volume curve
N=Concentration in equivalents per milliliter
W=Wieght of polymer in grams The relative viscosity (RV) used to measure molecular weight is determined by the procedure described in U.S. 2,385,890. The percent basic dye capacity is measured by determining the saturation value of a basic dye. Half-gram samples of yarn are rinsed with carbon tetrachloride to remove oily contaminants and conditioned to constant weight at 72 percent relative humidity and 21.1° C. and then heated in an aqueous solution containing 0.800 gram per liter of Sevron Blue 2G (CI Basic Blue 22) buffered at pH 5.5 with a citric acid disodium phosphate buffer for two hours at 75° C. The dyed yarn is removed and discarded; the spent dye liquor is cooled to room temperature and the percent absorption is measured spectrophotometrically. The residual dye concentration is determined from a calibration curve of dye concentration vs. the spectrophotometer percent absorption. The percent dye capacity is calculated as:

$$\text{Percent dye capacity} = \frac{(I-F) \times V}{W} \times 100$$

wherein:

I = Initial dye bath concentration in grams per milliliter
F = Final dye bath concentration in grams per milliliter
V = Volume of dye bath used in milliliters
W = Weight of yarn used in grams

*Example 1*

An evaporator is charged with 5900 pounds of a 50 percent, by weight, solution of the salt formed from equimolar quantities of adipic acid and hexamethylenediamine. The charge is heated and water removed until the temperature reaches 147° C. at a pressure of 18 pounds per square inch gauge. The concentrated salt solution is then blown into a stainless steel autoclave containing nitrogen at a pressure of 50 pounds per square inch gauge. The temperature is raised to 195° C. and the presure to 250 pounds per square inch gauge in 17 minutes. There is then added, through a charge pot, a slurry consisting of 53.9 pounds of sodium 3,5-dicarbomethoxy-benzenesulfonate, 13.3 pounds of hexamethylenediamine, 70 pounds of water, and 1.7 pounds of a silicone antifoam agent (acetyl polysiloxane marketed by Dow Corning as "DC Antifoam A"). The pressure is maintained and the temperature raised to 240° C. over a period of 67 minutes while water and methanol are removed. Ten minutes after the temperature reaches 195° C., 3.9 pounds of a slurry of titanium dioxide is added through a second charge pot. It is necessary that the two slurries be charged at separate times to prevent agglomeration of the titanium dioxide particles. At a temperature of 236° C., 47 grams of manganous hypophosphite is added. When the temperature reaches 240° C. the pressure is reduced to atmospheric pressure over a 70-minute interval while the temperature is being raised to 273° C. The polymer is held at 273° C. under steam at atmospheric pressure for 15 minutes. The polymer, at 273° C., is extruded onto a casting drum in the usual manner and the solidified polymer broken into particles. The polymer has a molecular weight of about 12,000 (31 RV), 33 amine equivalents/$10^6$ grams of polymer, 70 sulfonate equivalents/$10^6$ grams of polymer and a moisture content of 0.23 percent by weight, based on the weight of the polymer.

The particles of polymer are put into a vessel for solid phase polymerization. The polymer is treated for 4 hours by passing dry nitrogen, heated to a temperature of about 185° C., through the mass of particles. The further polymerized polymer has a molecular weight of about 15,000 (41 RV), 27 amine equivalents/$10^6$ grams of polymer and a moisture content of 0.06 percent, by weight, based on the weight of the polymer. This polymer is super dried since under equilibrium melt conditions the moisture content would be 0.13.

The polymer from the polymerizer is passed directly to a Royle Extruder. The extruder has a screw 31 inches in length and 2.5 inches in diameter. The polymer is heated to a temperature of 294° C. while being processed at the rate of about 60 pounds per hour. Since the polymer is super-dry, melting of the polymer is accompanied by further polymerization required to provide the necessary level of water for polymer equilibrium. The molten polymer is supplied to a spinneret for the spinning of a trilobal yarn. The polymer of the yarn filaments issuing from the spinneret has a molecular weight of about 17,000 (50 RV), 21 amine equivalents/$10^6$ grams of ploymer, and a moisture content of 0.08 percent, by weight, based on the weight of the polymer. The polymer, of course, maintains the original level of 70 sulfonate equivalents/$10^6$ grams of polymer. The polymer is spun into filaments and drawn and bulked in accordance with the teachings of U.S. Patent No. 3,186,155. The trilobal filaments, 68 in number, have a total denier of 1300, a tenacity of 2.9 grams per denier, an elongation of 44 percent, a basic dye capacity of 12.3 percent, and a modification ratio of 2.30 (U.S. 2,939,201).

In repetitions of the above polymerization and spinning procedure but using as a modifier a charge of 52.3 pounds of the sulfonate modifier (68 sulfonate equivalents/$10^6$ grams of polymer) and various weights of diamine, the resulting yarns have the properties reported in Table I.

TABLE I

| Example | Lbs. Amine | $NH_2$, Eq./$10^6$ g. | Percent Basic Dye Capacity | Molecular Weight | Relative Viscosity |
|---|---|---|---|---|---|
| 2* | 12.8 | 28 | 10.6 | 14,000 | 38 |
| 3 | 10.7 | 13 | 12.7 | 18,500 | 54 |
| 4 | 12.8 | 19 | 12.0 | 17,000 | 49 |

*N at 140° C. during solid phase polymerization.

In a control comparative to Examples 2, 3 and 4 in which the modifying charge employs 20.5 pounds of hexamethylenediamine (to produce 38 amine equivalents/$10^6$ grams of polymer, the yarn (mol. wt. 18,500) has a percent basic dye capacity of only 7.8. When an attempt is made to polymerize without any amine additive in the modifying charge, the resulting product has a molecular weight of only 12,000 (RV:31), although the percent basic dye capacity is 12.8 (amine equivalents/$10^6$ grams polymer:10). Due to the low molecular weight, only 10 pounds of yarn are spun from 330 pounds of polymer (3%) compared with 380 pounds of yarn from 400 pounds of polymer (90%) in Example 4.

As previously indicated, yarns formed from the compositions of this invention are of particular interest in cross-dyeing systems where they are dyed with mixed dyes simultaneously with yarns of different dye sensitivity. To illustrate the advantages of yarns prepared in the practice of this invention, the sulfonate-modified nylon of Example 4 (labeled yarn "A"), a regular acid-dyeing nylon labeled (yarn "B" and containing 40 amine equivalents/$10^6$ grams of polymer), and a deep acid-dyeing nylon (labeled yarn "C" and containing 75 amine equivalents/$10^6$ grams of polymer) are dyed in the same dye bath. Each of yarns "B" and "C" is prepared following the procedure of Example XXII of U.S. Patent No. 3,186,155 dated June 1, 1965. Yarn formed from the comparative control described above (38 amine equivalents/$10^6$ grams of polymer) is used and identified as yarn "D." In the dyeings a basic dye, Sevron Blue (C.I. Basic Blue 21) is used in one bath and an acid dye, Lanasyn Brilliant Red RL (C.I. Acid Red 263) is used in a second. A mixture of each of (1) A, B and C yarns and (2) D, B and C yarns is dyed in each bath. Each dyeing is carried out for 1 hour at a temperature of 96° C. with the bath at a pH of 7.2 and containing 0.5%, by weight, of dye. Each dyeing is evaluated by using the Gray scale for change in color (American Association of Textile Colorists and Chemists Manual, pt. II, B-53-55). The results are graphically shown in FIGURE II. As would be expected, yarn A has the greater resistance to acid dye staining. However, it will be noted that yarns B and C when associated with yarn A have less susceptibility to basic dye staining than when the same yarns are associated with yarn D. Thus, a fabric constructed containing yarns A, B and C and dyed in a single bath containing mixed dyes shows increased color clarity and sharper color contrast compared with a fabric containing yarn items D, X, and Y, and demonstrates the superiority of yarns of this invention for such cross-dye uses.

Polyamides suitable for modification in the practice of the present invention are those prepared from aliphatic dibasic carboxylic acids and aliphatic diamines such as adipic acid and hexamethylenediamine. While the present invention has been described and illustrated with respect to the modification of 66 nylon, it is apparent that the same principles can be used to modify other nylons such as, for example, 6 nylon and the nylon prepared from bis(p-aminocyclohexyl)methane and dodecanedioic acid.

In providing polyamides with sulfonate modification for basic dyeability, the level of sulfonate equivalents needs to be at least about 60. If less than about 60, the dye capacity of the fiber is too low. As the sulfonate level is increased, the dye capacity for basic dyes increases. However, at sulfonate levels much in excess of 100, acid-dye staining begins to become excessive and sulfonate levels greater than 100 are outside the scope of applicant's invention. Further, the basic-dye capacity increase for sulfonate levels higher than 80, at an amine level of 20, does not add materially to performance. Accordingly, it is preferred that the sulfonate level be about 60 to 80 equivalents/$10^6$ grams of polymer. A sulfonate level of about 70 equivalents/$10^6$ grams of polymer is most preferred, since this provides optimum basic-dye capacity with minimum acid-dye staining.

Sulfonate-modified polyamides of this invention are obtained by including in a polyamide-forming composition a sulfonated aromatic compound containing two amide-forming functional groups. Representative compounds of this type are of the general formula:

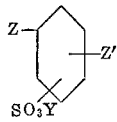

wherein the hexagon represents the benzene nucleus, Z— and —Z' are the same or different members of the class consisting of

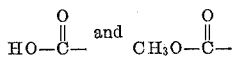

Y is a member of the class consisting of ammonium, sodium, lithium and potassium, and the radicals Z— and —Z' are relatively disposed in either the meta or para positions. When the Z— and —Z' radicals are relatively situated meta to one another, it is preferred that the radical —$SO_3Y$ be disposed to produce symmetrical substitution on the benzene nucleus.

The amount of sulfonate modifier incorporated into the polymer chain may be expressed in various ways such as percent by weight, mol percent used to prepare the polymer, equivalents/unit of weight and the like. When one means of expression is known, the others may, if desired, be obtained by calculation. Since the polymers of this invention are primarily of interest because of their dyeing behavior, the degree of modification is expressed in terms of equivalents/unit of weight. In common with established procedure the unit of weight chosen is $10^6$ grams. The sulfonate equivalents/$10^6$ grams may be determined by the formula:

Number of sulfonate equivalents/$10^6$ grams=
$$\frac{M \times 10^6}{P \times \text{molecular weight of } M}$$

wherein:

M=Grams of sulfonate modifier used
P=Grams of polymer produced.

A sulfonate level of 60–80 equivalents/$10^6$ grams of polymer will correspond to about 1.36–1.81 mol percent of sulfonate modifier.

As previously indicated, the amount of amine equivalents in the polymer is important if a polymer having acceptable dyeing properties is to be obtained. When the amine equivalents/$10^6$ grams of polymer exceeds about 30, acid-dye staining becomes excessive. Amine equivalents below 10, at molecular weights conducive to good spinning, cannot be readily achieved using normal manufacturing facilities. Polymers having this level of amine equivalents are achieved by polymerizing a polyamide-forming composition obtained by adding a substantial excess of adipic acid to a composition formed from equimolar amounts of dicarboxylic acid and diamine. The amount of excess adipic acid added to the balanced composition of nylon salt and sulfonate-modifier salt will be between 0.11 and 1.1 mol percent based on the total mols of balanced salt. The amount used will be determined by the amine equivalents and the molecular weight desired, with the larger amounts corresponding to the smaller amine equivalents and lowest molecular weights.

In a preferred embodiment of the present invention, the improved polymer is used in the production of filaments having a trilobal cross-section. As is known to those skilled in the art, the production of non-round cross-section filaments is markedly affected by the molecular weight of the polymer. The higher molecular weight polymers, having a higher viscosity, are more conducive to the formation of a given non-round cross-section. Even with optimum spinning conditions non-round cross-sections are difficult or impossible to produce with polymer having a low molecular weight. In the production of trilobal filaments, it is preferred that the polymer have a molecular weight of at least 15,000. As is known, increasing the acidity of a polymer reduces the molecular weight that can be obtained, and since substantial acidity is required to achieve the necessary low amine level, this requirement can lead to the formation of essentially useless polymers. To provide a polyamide having the required dyeing characteristics described above and a molecular weight high enough to permit continuous spinning of the desired trilobal yarn, the process of FIGURE I has been found particularly useful. Similar, though less drastic, considerations apply to the production of round cross-section filaments. That is, in providing polymer compositions having the required dyeing characteristics, it is necessary that the molecular weight be maintained at a level commensurate with the desired physical properties of nylon and which will provide good spinning performance. In this regard, it is preferred that the polymers have a molecular weight of at least about 13,000.

Many equivalent modifications of the present invention will be apparent to those skilled in the art from a reading of the above without a departure from the inventive concept.

What is claimed is:

1. A novel, linear polycarbonamide wherein recurring carbonamide linkages are an integral part of the polymer chain, the said polycarbonamide containing as an integral part of the polymer chain (1) sufficient units from the class consisting of

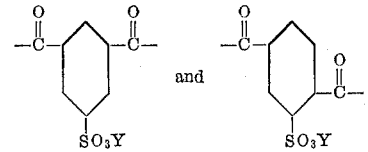

wherein Y is a member of the class consisting of ammonium, sodium, lithium and potassium to provide from about 60 to about 80 sulfonate equivalents and (2) amine ends to provide from about 10 to about 30 amine equivalents per $10^6$ grams of polymer, the said polycarbonamide having a molecular weight of between about 13,000 and about 23,000.

2. The polycarbonamide of claim 1 wherein the carbonyl groups of the sulfonate radical are meta-oriented.

3. The polycarbonamide of claim 2 wherein the predominant recurring units are derived from hexamethylenediamine adipate.

4. The polycarbonamide of claim 3 wherein about 70 sulfonate equivalents and about 20 amine equivalents per $10^6$ grams of polymer are present.

5. A multi-yarn fabric suitable for cross-dyeing in which one yarn is formed from the polycarbonamide of claim 1 and at least another yarn is formed from an acid-dye sensitive polycarbonamide.

6. The fabric of claim 5 wherein one yarn is formed from the composition of claim 4 and at least another yarn is formed from a polycarbonamide free of sulfonate substituents and containing at least about 40 amine equivalents per $10^6$ grams of polymer.

References Cited

UNITED STATES PATENTS

| | | | |
|---|---|---|---|
| 2,325,972 | 8/1943 | Nusslein et al. | 8—21 |
| 2,623,806 | 12/1952 | Fuchs | 8—21 |
| 2,798,281 | 7/1957 | Herzog | 8—21 XR |
| 2,922,690 | 1/1960 | Mueller et al. | 8—21 |
| 3,039,990 | 6/1962 | Huffman | 260—78 XR |
| 3,101,522 | 8/1963 | Hooper et al. | 28—75 XR |
| 3,105,732 | 10/1963 | Ortheil | 8—21 |
| 3,142,662 | 7/1964 | Huffman | 260—78 |
| 3,177,644 | 4/1965 | Aspy et al. | 57—140 |
| 3,184,436 | 5/1965 | Magat | 260—78 |
| 3,296,204 | 1/1967 | Caldwell | 260—78 XR |

JOHN PETRAKES, *Primary Examiner.*